United States Patent [19]

Seitz

[11] 3,851,292
[45] Nov. 26, 1974

[54] MOTION TRANSDUCER
[76] Inventor: William K. Seitz, 5342 Windswept, Houston, Tex. 77027
[22] Filed: Mar. 14, 1973
[21] Appl. No.: 341,084

[52] U.S. Cl. ............... 338/114, 74/1 D, 74/1 E, 340/177 VA, 340/282
[51] Int. Cl. ............................................. H01c 13/00
[58] Field of Search ....... 73/1 D, 1 E, 88 R, 88.5 R, 73/88.5 SD, 141 R, 141 A, 142; 310/8.4; 340/267 C, 282, 52 H, 177 VA; 338/4, 5, 46–47, 114; 323/75 N; 212/39 A; 74/37; 85/32 K; 64/8; 74/409

[56] References Cited
UNITED STATES PATENTS

| 1,848,347 | 3/1932 | Jarvis ................................ 85/32 K |
| 2,045,474 | 6/1936 | Kemler .................................. 338/5 |
| 2,321,322 | 6/1943 | Ruge ................................. 338/114 |
| 2,765,668 | 10/1956 | Milne .................................. 74/409 |
| 3,362,022 | 1/1968 | Mork et al. .................... 340/282 X |
| 3,401,568 | 9/1968 | Blatt ..................................... 74/37 |
| 3,590,289 | 6/1971 | Ostwald ............................. 310/8.4 |
| 3,609,994 | 10/1971 | Colletti et al. ......................... 64/8 |

FOREIGN PATENTS OR APPLICATIONS 666,529    7/1963    Canada ............................... 74/409

Primary Examiner—J. D. Miller
Assistant Examiner—Harry E. Moose, Jr.
Attorney, Agent, or Firm—Richards, Harris, & Medlock

[57] ABSTRACT

A motion transducer for sensing rotary motion includes a helix screw for converting the rotary motion into a linear movement to produce a strain in a gauge beam to which is mounted strain responsive elements. For a radius transducer utilizing such a converting assembly a pendulum is mounted on a shaft supported by bearings in a mounting plate. On the opposite end of the supporting shaft a groove is cut to engage an angle lever coupled to a helix screw. The helix advances through threaded apertures to produce a linear movement in response to rotation of the pendulum. This linear movement flexes a strain gauge beam onto which is mounted two strain responsive elements such that a linear movement of the helix screw puts one of the strain responsive elements under a compressive load and the second strain responsive element under a stretching load. These elements are connected in adjacent arms of a bridge circuit. To minimize hysteresis in the transducer, a silicon rubber bonds the angle lever into the shaft groove. To sense a linear motion, the pendulum is replaced with a linear-to-rotary motion converter.

15 Claims, 6 Drawing Figures

MOTION TRANSDUCER

This invention relates to electromechanical transducers for converting a mechanical motion into an electrical signal, and more particularly to a motion transducer for converting a rotary motion into a linear movement.

Electromechanical transducers of the type to which this invention relates commonly employ, whether they be used for measuring angle (in degrees, minutes and seconds), radius or diameter (in feet, inches or microinches), or through a rectilinear assembly, sense linear motion, a transducing element for detecting the relative movement of two parts and for developing an electrical signal corresponding to the relative movement. Such relative movement is measured by various kinds of strain gauges, with the recent development of semiconductor strain gauge elements almost completely replacing other older design strain gauges.

In each application of the transducer of the present invention, electric signals are generated by converting a variable angle from a known axis (X or Y) of a circle to a helix of a screw, through a combination of mechanical links and sensing the linear movement (the helix) with a semiconductor strain gauge element. As an example of an application of the about to be described transducer, the output signals are related to the radius from the center pin of a lifting boom (such as employed in cranes for construction equipment) to the hook load of the crane during all phases of operation. The transducer is mounted on the side of the boom with the electrical output signals therefrom connected to a monitoring device visible to the crane operator.

A feature of the present invention is to provide a motion transducer for the measurement of rotary and linear motion under varying ambient temperature and environmental conditions. A further feature of the present invention is to provide a motion transducer having a minimum of hysteresis error in the electrical output signal. Still another feature of the present invention is to provide a motion transducer wherein rotary motion is converted into a linear movement for applying a stress in a beam supporting strain gauge elements. Yet another feature of the present invention is to provide a motion transducer wherein strain gauge elements are connected in adjacent arms of a bridge circuit and mounted on a material having a similar coefficient of thermal expansion to minimize an error voltage output from the strain gauge elements.

In accordance with the present invention, a motion transducer having an electrical output generated by a strain responsive element includes an actuator housing having an opening therethrough with the strain responsive element mounted thereon and the housing affixed to means providing a rotary motion. A threaded aperture is assembled into a housing opening with a helix threaded shaft rotationally mounted in the aperture to exert a force on the strain responsive elements to thereby vary the electrical output therefrom. The helix threaded shaft is coupled to the means for providing a rotary motion.

In accordance with another embodiment of the present invention, a motion transducer as described wherein the means for providing the rotary motion is coupled to a linear-to-rotary motion converter.

A more complete understanding of the invention and its advantages together with the various features thereof, will be understood more fully from the following specification taken in conjunction with the accompanying drawings wherein.

Figure 1:
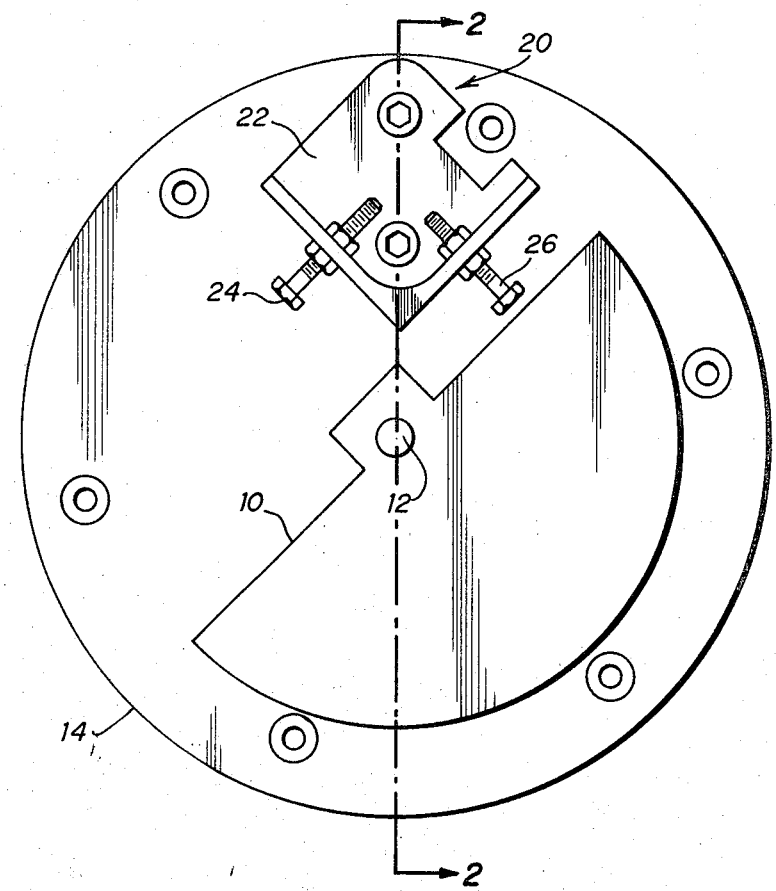
FIG. 1 is a front view of a rotary motion radius transducer having a rotationally mounted pendulum with position stops for restricting the pendulum movement.
Figure 2:
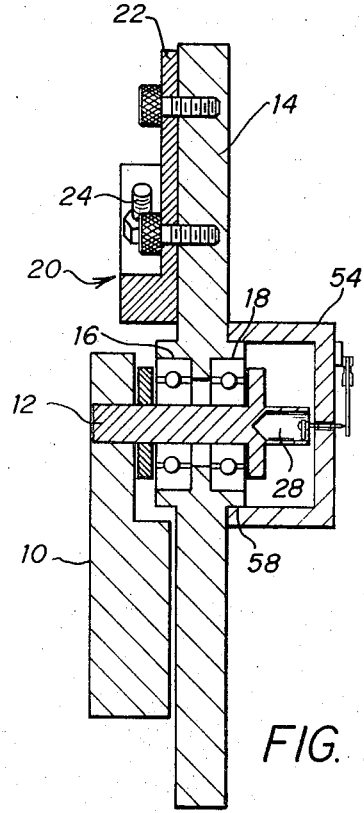
FIG. 2 is a side view in section of the rotary motion transducer of FIG. 1 taken along the line 2—2.
Figure 3:
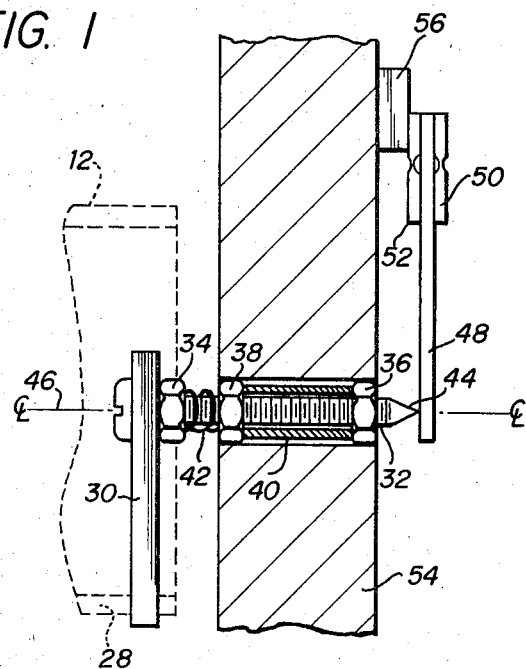
FIG. 3 is an expanded view of the helix threaded shaft for converting the rotational motion of the pendulum into a linear movement.

Referring to FIGS. 1–3, there is shown a rotary motion transducer including a pendulum 10 mounted to a pendulum shaft 12 rotatably mounted in a mounting plate 14. The pendulum shaft 12 is mounted in the plate 14 by two precision ball bearings 16 and 18 press fit into an opening of the plate. A tandem bearing arrangement such as shown provides accurate positioning of the shaft 12 to rotate about a given axis with a minimum of eccentricity.

As illustrated, the transducer of FIGS. 1–3 produces an output varying with the angle of the position of the pendulum 10 with respect to the mounting plate 14. To restrict the movement of the pendulum to a prescribed quadrant, a stop fixture 20 is bolted to the mounting plate 14. The fixture 20 includes a support bracket 22 and position pins 24 and 26. Typically, the pins 24 and 26 are adjustable to vary the limits of travel of the pendulum 10. The pins 24 and 26 are displaced from the surface of the mounting plate 14 such that they contact surfaces of the pendulum 10.

Opposite from the pendulum 10, the pendulum shaft 12 has a slot 28 formed therein to mate with an angle lever 30 as part of a helix drive for converting the rotary motion of the shaft 12 into a linear movement at a strain gauge sensor. To convert the rotary motion of the shaft 12 into a linear movement, the angle lever 30 is fastened to a helix screw 32 by means of a clamp nut 34. Further, as the clamp nut 34 is tightened against the lever arm 30, an adhesive bond is provided between the nut and the lever arm.

The helix screw 32 rotates in the helix assembly including threaded apertures 36 and 38 spaced apart by a tension stop 40. The tension stop 40, between the apertures 36 and 38, applies a slight pressure in opposing directions of the helix screw 32. This opposing pressure tends to remove any lateral displacement of the helix screw due to machining tolerances. A tension spring 42 is positioned between the aperture 38 and the clamp nut 34 and as the threads of the helix screw 32 wear, this spring maintains a pressure in one direction to further minimize lateral displacement of the helix screw 32 due to wear on the thread surfaces. This tends to minimize the effects of hysteresis on the system.

In forming the helix screw 32, it is significant to maintain the point 44 along the longutudinal axis 46 of the screw 32. Any eccentricity of the point 44 will appear as a nonlinear movement of the pendulum 10 at the output voltage of the transducer.

Mounted in an opening in a housing 54 is the helix assembly consisting of the apertures 36 and 38 and the tension stop 40. The housing 54 is attached to a machined boss 58 of the mounting plate 14.

The linear movement of the helix screw 32 is transmitted to a strain gauge beam 48 by an application of pressure thereto. The point 44 of the helix screw 32 is not attached to the beam 48 but is in physical contact therewith. Strain responsive elements 50 and 52 are mounted to the strain gauge beam 48 at the end opposite from the helix screw 32. The strain gauge element end of the beam 48 is mounted to the housing 54 by means of a spacer block 56. The spacer block 56 is of a ceramic material to provide electrical insulation between the strain responsive element 52 and the housing 54.

The strain responsive elements 50 and 52 are preferably of a silicon semiconductor material of P-type. This type of material is especially advantageous to use since it has a higher gauge factor, a higher yield point and a higher Youngs Modulus than that of N-type materials. However, N-type material may be employed.

To minimize thermal errors in the gauge element assembly, the strain gauge beam 48 is made of the same material as the elements 50 and 52, that is, if the elements are semiconductor material of a P-type then the beam is made of silicon material similar to P-type. Therefore, both the elements 50 and 52 and the beam 48 are thermally stable in that each part has the same coefficient of thermal expansion thus minimizing thermal variation error at the output of the transducer.

In operation, as the helix screw 32 applies a pressure to the housing side of the beam 48, the strain responsive element 50 is forced into compression while the strain responsive element 52 is in a stretching mode. This action is equal and opposite and the difference between the two is measured in a bridge circuit.

Additional features of the present transducer which improves the accuracy thereof is that any eccentricity between the longitudinal axis of the shaft 12 and the longitudinal axis of the helix screw 32 is tolerated by the coupling of the angle lever 30 with the slot 28. This allows the angle lever 30 to have axis slippage with reference to the pendulum shaft 12. Further, as the helix screw 32 moves in and out of the apertures 36 and 38, the angle lever 30 slides in and out of the slot 28. Any tolerance other than as described, will be interpreted as hysteresis in the operation of the transducer. To further minimize hysteresis, when the lever 30 is assembled into the slot 28 a silicon RTV is applied into the slot and on the angle lever. This RTV acts as a spring and removes any tolerance such as to minimize hysteresis in the coupling of the two members, and at the same time, allowing the in and out movement required for operation of the helix screw 32.

In one prototype, the helix screw 32 comprised a precision stainless steel screw with one hundred twenty threads per inch. To compute the travel of such a helix in inches per degree of rotation, the number of threads per inch of the screw 32 is divided into 1,000, for example, (1,000 × 0.001 inches = 1 inch/120 = 0.008333). Thus, during one rotation of the screw with 120 threads per inch the linear movement of the helix equals 0.008333 inch. To determine the linear movement of the helix for a 90° rotation of the pendulum 10 the total linear motion for one rotation is divided by four, that is, 0.008333/4 = 0.002083. Converting this into degrees per linear travel of the helix screw 32, the linear motion of the screw per quadrant is divided by 90, that is, 0.002083/90 = 0.000023. Thus, the helix screw 32 moves 0.000023 inch per degree of rotation of the pendulum 10.

To convert this linear motion into an electrical signal, the strain responsive elements 50 and 52 are coupled into a bridge network.

Figure 4:
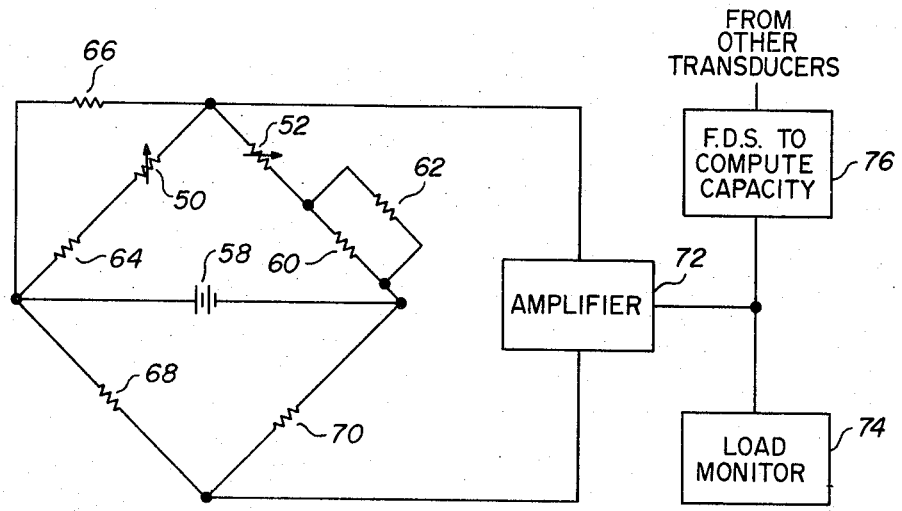
FIG. 4 is a schematic diagram of a bridge circuit incorporating strain responsive elements of the transducer of FIG. 1.

Referring to FIG. 4, there is shown a schematic of an electrical network including the strain responsive elements 50 and 52 in adjacent arms of a bridge circuit. The bridge is energized from a source of DC voltage such as the battery 58. In series with the element 52 is a resistor 60 with a temperature compensation resistor 62 parallel therewith. In series with the element 50 is a resistor 64 and this arm of the bridge is in parallel with a balance resistor 66. The resistors 62 and 66 are shown for one condition of offset for the bridge, for an offset in a different direction the resistors 62 and 66 are placed in other arms of the bridge. The bridge is completed by resistors 68 and 70 in arms opposite from the elements 50 and 52, respectively.

A voltage output from the bridge that varies in accordance with the strain on the elements 50 and 52 is coupled to the input of a signal conditioner and amplifier circuit 72 having an output tied to a load monitor 74 which may be a visual display or recorder. An output from the amplifier 72 may also be coupled to a computer 76 along with other transducers to compute the load distribution for a complex of motion transducers.

In operation of the bridge circuit, the difference between the resistances of the two arms containing the elements 50 and 52 are being measured. The positive arm, e.g., element 50, is in compression, while the negative arm (element 52) is in a stretching mode. As long as the outside forces, that is, other than strain forces, on the strain elements are equal, be it thermal or mechanical, there will be no shift in the balance of the bridge. For example, a lateral force applied to the strain gauge beam 48 will cause the positive arm of the element 50 and the negative arm of the element 52 to be stressed in the same direction, causing a shift in the resistance in each arm of the bridge. This shift in resistance will be identical in each arm and in the same direction and will therefore not produce a change in the difference between the ohmic value of the two bridge arms.

When a current is passed through the strain responsive elements 50 and 52 as connected in adjacent bridge arms, it produces heat which changes the resistance at the silicon elements. However, since both the elements 50 and 52 and the strain gauge beam 48 are constructed from similar material, the thermal change produced by the current effects both arms simultaneously, causing identical temperature balance. Since the output of the bridge varies with the difference between the ohmic values in adjacent arms, any changes that effect the bridge in the same manner has a nulling effect. Thus, improved temperature compensation is provided.

Figure 5:
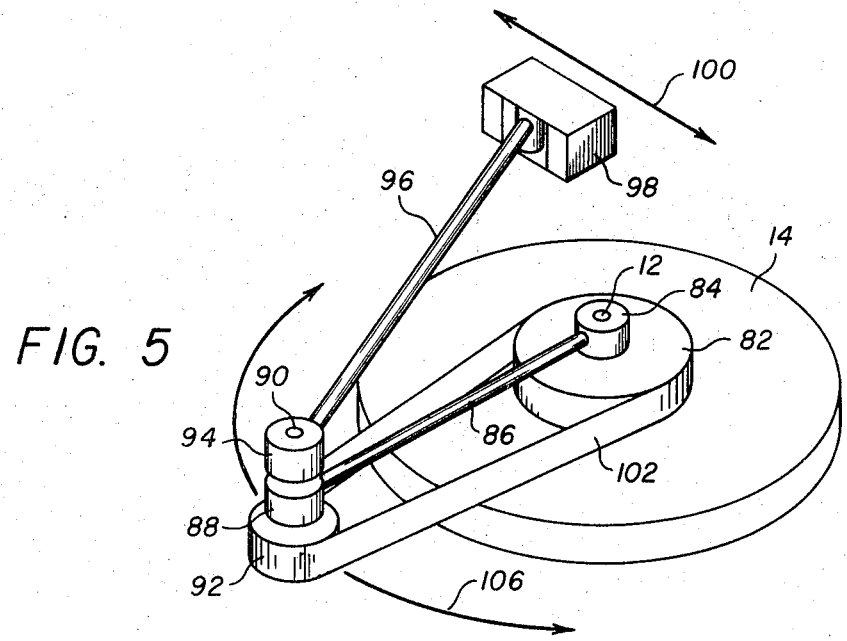
FIG. 5 is a perspective view of a linear-to-rotary movement converter for use with the transducer of FIG. 1 replacing the pendulum.
Figure 6:
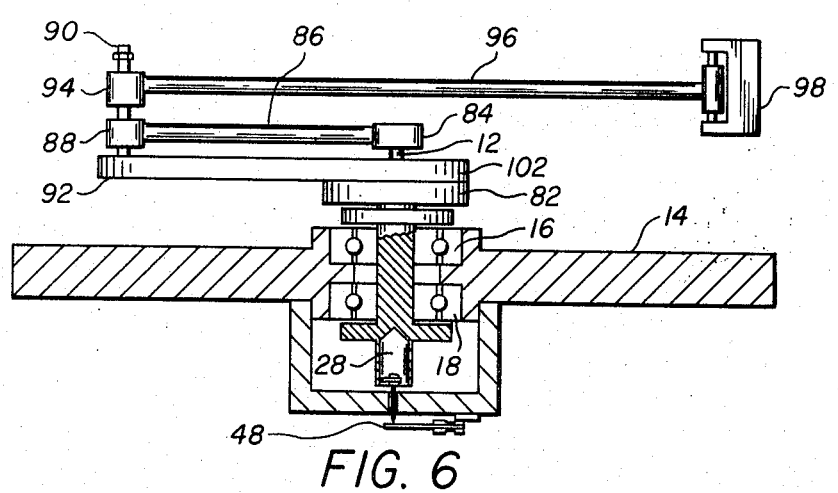
FIG. 6 is a side view, partially in section, of the converter of FIG. 5 coupled to the helix shaft transducer of FIG. 3.

Referring to FIG. 5, there is shown an embodiment of the invention wherein the pendulum 10 is replaced with a linear-to-rotary motion converter.

A smooth surface pulley 82 replaces the pendulum 10 coupled to the shaft 12. Pivotally mounted to the shaft 12 is a bearing 84 having an arm 86 extending therefrom to a bearing 88. The bearing 88 pivots on a shaft 90 having a smooth surface pulley 92 affixed thereto. Also pivotally mounted on the shaft 90 is a bearing 94 having an arm 96 extending therefrom to a fixture 98 coupled to a linear motion as indicated by the arrow 100.

Encircling the pulleys 82 and 84 is a band 102 such that a rotation of the pully 92 is transmitted to the pulley 82 through the band. In operation of the linear-to-rotary motion converter, a linear movement as along the arrow 100 causes the fixture 98 to be displaced linearly thereby causing the shaft 90 to rotate in an arc as indicated by the arrows 104 and 106 as determined by the arm 86. As the shaft 90 moves in an arc as determined by the arm 86, there is developed a relative movement between the pulleys 82 and 92. This movement is transmitted by the band 102 thereby causing a rotation of the shaft 12 in the bearings 16 and 18. Rotation of the shaft 12 is transmitted through the lever arm 30 to the helix screws 32, as explained, thereby developing an electrical output related to the linear movement of the fixture 98.

Although several embodiments of the invention, together with modifications thereof, have been described in detail herein and shown in the accompanying drawings, it will be evident that various further modifications are possible without departing from the scope of the invention.

What is claimed is:

1. A motion transducer having an electrical output provided by a strain responsive element, comprising in combination:

an actuator housing having end plates with an opening through each end plate, the strain responsive element mounted to said housing to extend over the opening of one end plate, a first internally threaded aperture in the opening of one end plate of said housing;

a second internally threaded aperture in the opening of the one end plate of said housing and spaced from said first aperture;

a threaded shaft mounted through said first and second apertures and having one end in contact with the strain responsive element;

means for converting a mechanical motion into a rotational movement; and a drive shaft rotatably mounted through the second end plate of said housing to couple the rotational movement to said threaded shaft.

2. A motion transducer as set forth in claim 1 wherein said drive shaft is rotatably mounted in the opening of said plate by two axially displaced ball bearing assemblies.

3. A motion transducer as set forth in claim 1 including a tension stop spacer between said first internally threaded aperture and said second internally threaded aperture in the opening of said housing.

4. A motion transducer as set forth in claim 3 including a tension spring positioned around said threaded shaft between the first threaded aperture and the means for coupling.

5. A rotary motion transducer having an electrical output provided by a strain responsive element, comprising in combination:

an actuator housing having opposed end plates with an opening in one end plate axially aligned with an opening in the opposed end plate, the strain responsive element mounted to said housing to extend over the opening of one end plate;

a first threaded aperture in the opening of one end plate of said housing;

a second internally threaded aperture in the opening of the one end plate of said housing and spaced from said first aperture;

a threaded shaft mounted through said first and second apertures and having one end in contact with the strain responsive element;

a drive shaft rotatably mounted in the opposed end plate of said housing and coupled to transmit a rotary motion to said threaded shaft; and a pendulum weight attached to said drive shaft and rotatable with respect to the actuator housing.

6. A rotary motion transducer as set forth in claim 5 including a lever attached to the threaded shaft and engaging a slotted end of said drive shaft to convert the rotary motion of the latter into a linear movement at the strain responsive element.

7. A rotary motion transducer as set forth in claim 5 including stop means attached to one of the end plates and positioned with respect to the pendulum weight to restrict the movement thereof.

8. A rotary motion transducer as set forth in claim 5 including a tension stop spacer between the first internally threaded aperture and said second internally threaded aperture within the opening of the one end plate of said housing.

9. A rotary motion transducer as set forth in claim 8 including a tension spring positioned around said threaded shaft between one of said internally threaded apertures and said drive shaft.

10. A motion transducer having an electrical output provided by a strain responsive element, comprising in combination:

an actuator housing having opposed end plates with an opening in one end plate axially aligned with an opening in the opposed end plate, the strain responsive element mounted to said housing to extend over the opening of one end plate;

a first internally threaded aperture in the opening of the one end plate of said housing;

a second internally threaded aperture in the opening of the one end plate of said housing and spaced from said first aperture;

a threaded shaft mounted through said first and second threaded apertures and having one end in contact with the strain responsive element;

a drive shaft rotatably mounted in the opposed end plate of said housing to couple a rotary motion thereof to said threaded shaft; and means coupled to said drive shaft to convert a linear movement into a rotational motion.

11. A motion transducer as set forth in claim 10 wherein said means coupled to said drive shaft to convert a linear movement into a rotational motion includes:

a first pulley, a second pulley fastened to said drive shaft and rotatable therewith in the end plate of said housing, means for maintaining said first and second pulleys at a fixed radial displacement, a band encircling the first and second pulleys, and means coupled to a source of linear movement to displace the second pulley in an arc about said first pulley.

12. A motion transducer as set forth in claim 10 wherein said means coupled to said drive shaft to convert a linear movement into a rotational motion includes:

a first pulley having a pivot pin extending therefrom, a second pulley fastened to said drive shaft and rotatable therewith and including a pivot pin extending therefrom, a first linkage having one end pivotally mounted to the pivot pin of the first pulley and a second end pivotally mounted to the pivot pin of the second pulley, a second linkage having one end oriented to move in a linear direction and a second end pivotally mounted to the pivot pin of said first pulley, and a band encircling the first and second pulleys.

13. A motion transducer as set forth in claim 10 including a tension stop spacer between said first internally threaded aperture and said second internally threaded aperture in the opening of the one end plate of said housing.

14. A motion transducer as set forth in claim 13 including a lever attached to the threaded shaft and engaging a slotted end of said drive shaft to convert the rotary motion of the latter into a linear movement at the strain responsive element.

15. A motion transducer as set forth in claim 14 including a tension spring positioned around said threaded shaft between one of said threaded apertures and said level.

* * * * *